United States Patent Office 3,553,008
Patented Jan. 5, 1971

3,553,008
PROCESS FOR THE PRODUCTION OF MICROPOROUS SHEET-FORM PRODUCTS PERMEABLE TO WATER VAPOUR
Artur Reischl and Harro Traubel, Leverkusen, and Bruno Zorn, Cologne-Flittard, Germany, assignors to Farbenfabriken Bayer Aktiengesellschaft, Leverkusen, Germany, a corporation of Germany
No Drawing. Continuation-in-part of application Ser. No. 606,562, Jan. 3, 1967. This application Feb. 28, 1969, Ser. No. 803,437
Claims priority, application Germany, Jan. 3, 1966, F 48,079
Int. Cl. B44d 1/44; D06n 3/14
U.S. Cl. 117—161           10 Claims

ABSTRACT OF THE DISCLOSURE

A process for producing a vapor permeable, microporous, leatherlike sheet material by dissolving a polyurethane in a first liquid (solvent) to which is added a second liquid (non-solvent) in which the polyurethane is insoluble but which is miscible with the solvent, shaping the solution on a suitable substrate and removing both the solvent and the non-solvent.

---

This application is a continuation in part of application Ser. No. 606,562, filed Jan. 3, 1967, now abandoned.

It is known that porous films or foils can be deposited from polymer solutions by addition of a non-solvent for the dissolved polymer which is miscible with the solvent. In this process the solvent is extracted by the non-solvent leaving the polymer behind. Among the disadvantages of this process are the excessive quantities of non-solvent required to remove the solvent completely, and the considerable time required to carry out the process itself.

An object of this invention is an improved process for producing microporous sheets which are permeable to water vapor.

Another object of this invention is to avoid the cumbersome technique of producing such sheets as explained above.

These objects are achieved, generally speaking, by providing a solution of a polyurethane which has a Shore-A-hardness of above 35, a tensile strength of above 70 kp./cm.$^2$ and a softening point of above 120° C. in an organic solvent in which the polyurethane is soluble; adding to this solution a liquid which is a non-solvent for the polyurethane but which is miscible with the solvent, which non-solvent meets the following conditions:

(1) The polyurethane absorbs less than 50% of its own weight of the non-solvent within 24 hours,
(2) The relative vaporization number of the non-solvent is higher than that of the solvent, and
(3) The non-solvent is present in an amount of at least 60% of the quantity necessary to gell the polyurethane solution. The solution is shaped and the solvent and non-solvent are evaporated from the solution after shaping.

Shaping of the solution may either be effected on a non-porous substrate (glass-plate, steel) with subsequent removal of the produced sheet, and if desired, transferred to a porous substrate or shaped directly on a permanent porous substrate.

The term polyurethane in the present context is understood to mean any polyurethane having the above indicated minimum values of tensile strength, shore-A-hardness and softening point.

Thus this term includes (1) Isocyanate polyaddition products (a) which conform to the above specification
(2) Isocyanate polyaddition products (a) which do not per se meet these requirements but do so after crosslinking in admixture with (b) additional polyisocyanates and/or formaldehyde or formaldehyde donors and/or peroxides or (c) other compounds reactive with isocyanates including polymers reactive with isocyanates or mixtures of both (b) and (c).

When products according to (2) above are used, crosslinking may be effected simultaneously with the production of the sheet. This means, one of the mixtures specified is used as the polyaddition product. As already stated, this method can only be used, if the crosslinked product produced meets the above identified minimum values of tensile strength, shore-A-hardness and softening point.

The isocyanate-polyaddition products (a) are prepared by known processes. In order to obtain high molecular weights and to meet the above mentioned requirements an NCO/OH or NCO/NH$_2$ ratio of 0.6 to 1.5, preferably 0.9–1.1 is generally used. As the products are to be dissolved the reaction components are preferably bifunctional, where tri- and polyfunctional reaction components are simultaneously used, the NCO/OH or NCO/NH$_2$ ratio may be lower than the aforementioned value.

The polyaddition reactions are preferably carried out in bulk and the adducts are heated, if desired, until the NCO-content is less than 2% by weight or, to even greater advantage, less than 0.3% by weight. In order to guarantee the solubility of the isocyanate polyaddition products (a) in low-boiling solvents, they should contain less than 0.6 equivalent of reacted NCO, preferably 0.15 to 0.35 equivalent per 100 g. of product.

Compounds with hydroxyl- and/or amino-groups and a molecular weight from 500 to 20,000, preferably from 1,000 to 3,000 are suitable for the preparation of polyaddition products (a), for example, polyesters or, in particular, polymixed esters or polyester mixtures as well as polyesteramides, polyethers, polythioethers or polyacetals in which urethane, N-alkyl or N-allyl urethane groupings may already be present. Hydroxyl- or aminofunctional organosiloxanes may be used as additional components on the organic radical.

In the case of reaction components with secondary hydroxyl groups, e.g. poly(oxypropylene)glycols it has proved to be of advantage to react initially only about 2 mols of diisocyanate per mol of hydroxyl compound at elevated temperature (120–180° C.) by the multi-stage process until all the secondary hydroxyl groups have been consumed. If desired, more diisocyanate can be subsequently added, and a chain-extending reaction carried out.

Aromatic and aliphatic diisocyanates or their mixtures can be used to produce polyaddition products (a), e.g. 4,4'-diphenylmethane diisocyanate, 2,4- or 2,6-toluylene diisocyanate and 1,6-hexamethylene diisocyanate. Higher functional polyisocyanates may be, for example, triphenylmethane-4,4'-4''-triisocyanate, tris-[4 - isocyanatophenyl]-thiophosphoric acid ester, as well as polyisocyanates carrying biuret groups such as the biuret triisocyanate which can be obtained from 3 mols of hexamethylene diisocyanate and 1 mol of water, or polyisocyanates containing low molecular weight urethane groups, for example those obtainable from 3 mols of 2,4-toluylene diisocyanate and 1 mol of trimethylol propane. Also to be mentioned are crude, industrial polyisocyanate mixtures, for example mixed toluylene diisocyanates and, in particular, the phosgenation product of aniline-formaldehyde condensates and trimerised 2,4-toluylene diisocyanate.

Examples of chain extenders with a molecular weight of up to 500 suitable for the preparation of addition product (a) are ethylene or polyethylene glycols, butane and butene diol, 1,6-hexamethylene glycol, N-methyl-bis-[β-hydroxyethyl]amine, allyl - monoglycerol ether, 3,3'-dichloro-4,4'-diaminodiphenyl methane, ethanolamine and water. Polyhydric alcohols with 3 or more OH groups such as glycerol, trimethyl ethane, trimethylol propane, 1,2,6-hexane triol or pentaerythritol are only used in small quantities, if at all. Chain extending with $C_3$-$C_6$-glycoles, which may also contain ether, ester, acetal, carbamide, urethane or N-(alkylurethane)-groupings, is preferred over the amine or water extension.

The addition products (a) must have a tensile strength greater than 70 kp./cm.$^2$ and a Shore-A-hardness of greater than 35 when they are in the form of a homogeneous, i.e. non-porous film. The softening point should lie above 120° C. In cases where other polymers are mixed in with or incorporated in the polyurethanes, the above data will relate to these combinations. Thus it would be possible, for example, to impart the above properties to a basically unsuitable, tacky, i.e. excessively soft polyurethane by the addition of polyvinyl chloride, making it suitable for the production of porous sheet-form products.

The tensile strength of the isocyanate-polyaddition product (a) is determined in accordance with IUP 6 (Das Leder, 1959, 16) on 4-cm. test specimens prepared from a clear, bubble-free film which is obtained from a solution of the polymer and which should be between 0.1 and 0.5 mm.-thick. Hardness is determined in accordance with the Shore-A-method (DIN 53505). The softening range of the polymer can be measured in known manner, for example on a Kofler block (cf. for example Houben-Weyl (1953), Analytische Methoden, 789, 792).

Solvents for the isocyanate-polyaddition product (a) are, for example, acetone, methyl ethyl ketone, tetrahydrofuran, ethyl acetate, methylene and ethylene chloride. In this context, "solutions" are preferably organic solutions containing colloidal particles which can be treated by the process according to the invention in the same way as true solutions. Generally, they show the Tyndall effect. The concentration of addition product (a) is preferably such that the solution can be stirred and does not contain any gel lumps.

Polyisocyanates (b) which are added to the solution may be the same as those used in the preparation of the polyaddition product (a). It is preferred to use those of low vapour pressure, including for example the dimerisation and trimerisation products of toluylene diisocyanate. The addition product of trimethylol propane and 2,4-toluylene diisocyanate, the ester of tris-[4-isocyanatophenyl]-thiophosphoric acid, and the biuret triisocyanate which can be obtained from hexamethylene diisocyanate and water, are particularly suitable. An industrial polyisocyanate mixture obtained as a phosgenation product from a crude aniline-formaldehyde condensate, is equally suitable. Conventional accelerators for example, tertiary amines, lead or tin compounds, are preferably added.

The formaldehyde which may also be added, if desired may be introduced into the dissolved addition product (a) in the gas phase, in solution or in the form of a formaldehyde donor.

Suitable formaldehyde donors are C-, N-, P-, O- or S-methylol compounds or their methyl ethers, as well as oligomers or polyfunctional derivatives of methylol compounds, cyclic acetals of formaldehyde, methylol-N-acetals, formals, urea- or melamine-formaldehyde adducts and high molecular weight members of these classes of compounds.

The methylol grouping or methoxymethyl grouping may even be incorporated during the preparation of polyaddition product (a).

In cases where an organic solvent which is miscible with water is used, for example, tetrahydrofuran, an approximately 38% aqueous solution of formaldehyde may be gradually added dropwise, optionally at slightly elevated temperature. It is also possible to use hexamethylene tetramine.

The reaction in which formaldehyde is crosslinked usually requires catalysis. Suitable catalysts for the crosslinking condensation are, for example, hydrochloric acid, nitric acid, fluoboric acid, oxalic acid, tartaric acid, maleic acid, formic acid, monochloro-, dichloro- or trichloroacetic acid, or p-toluene sulphonic acid, as well as complexes of Lewis acids with tertiary amines, for example the zinc chloride-quinoline complex.

Suitable peroxides, which may also be added if desired, are advantageously those with a decomposition point below 120° C. for example di-tert.-butyl peroxide, tert.-butylcumyl peroxide, tert.-butyl perbenzoate and dilauroyl peroxide.

The crosslinking of the isocyanate-polyaddition products with the compounds (b) significantly improves the resistance of the products obtained by the process according to the invention both to chemicals and to high temperatures. Furthermore, the use of additional polyisocyanates enables the hardness and handle of the polyaddition product (a) to be readily modified as desired with the aid of simultaneously-incorporable compounds.

Reactions of this kind cannot be carried out in cases where, for example, polyurethanes are dissolved in dimethyl formamide and then deposited, and the solvent extracted, with water.

Additional compounds (c) reacting with isocyanates which can be added to the solution are, for example, all the aforementioned relatively high molecular weight and low molecular weight compounds carrying hydroxyl groups and/or amino groups, as well as polyoxymethylene glycols and alkoxylation products of polyhydric alcohols, amines or acids of phosphorus, and hydroxyl- or aminofunctional organosiloxanes of the kind described, for example, in DAS 1,114,632 and 1,190,176 and in United States Patent 3,243,475 and Canadian Patent 740,041. In principle, the organofunctional polysiloxanes can be incorporated during the preparation of polyaddition product (a) in order to improve its hydrophobic properties, or, in cases where they contain tertiary nitrogen, could simultaneously act as reaction accelerators. Small quantities of organosilicon compounds in which there are no incorporable groupings, may also with advantage be used.

Examples of polymers (c) which may be combined with solution (a) to modify handle, elasticity and hardness are polyvinyl chloride, ethylene/vinyl acetate polymers, styrene/acrylonitrile polymers, butadieneacrylonitrile polymers, polyacrylates, polymethacrylates, polychlorobuadiene, polycarbonates and polyoxymethylene. These polymers may also contain groups reacting with isocyanates. They are preferably added in solution. Comparison tests with the aforementioned pure polymers have shown that they are only of interest as mixed components for modifying the polyurethanes.

The non-solvent is added slowly, optionally dropwise, to solution (a) with thorough stirring, if desired after (b) and/or (c) have been added. Mechanical stirrers with rotational speeds of between 1,000 and 25,000 r.p.m. are advantageously used.

Suitable non-solvents are, for example, aliphatic hydrocarbons such as n-heptane, iso-octane and the mixture known as ligroin or white spirit with a boiling point of between about 90 and 150° C., as well as alcohols such as ethanol, n- or isopropyl alcohol, or n-, iso- or tert.-butanol and ethers of fairly high boiling point, such as dibutyl ether.

In cases where the non-solvent is added in such quantities that swelling occurs, or in even larger quantities, the serum precipitated should be removed before the gelled solution is processed or formed. In general, however, it is preferred to work below the gelling point. On the other hand, no less than 60% of the quantity of non-solvent required to produce gelling should be incorporated in solution (a) and, if desired, in (b) and/or (c).

The quantity of non-solvent required to gell the solution can be determined by adding non-solvent dropwise to the solution with stirring until there is marked increase in viscosity and the mixture, after standing for a short while, for example 1 to 5 minutes, forms a serum above or below a gelled, opaque, viscous and gel-like mass.

The non-solvent used must be miscible with the solvent or the polymer solution in the required molar ratio to be employed. In addition, it must have a higher relative evaporation index than the solvent. The relative evaporation index of the solvent is determined in accordance with DIN 53170. It is possible to use mixtures of solvents. In addition, the swelling action of the non-solvent must be so weak that a circular piece of film of the polymer 3 cm. in diameter and 0.2 to 0.5 mm.-thick, introduced into the non-solvent absorbs less than 50% by weight thereof over a period of 24 hours. The reduction in the permeability to light of the solution may be used to determine the requisite quantity of non-solvent. As the amount of non-solvent added is increased, its permeability to light is compared, for example with a Zeiss Elko III Colorimeter (with a J. 66.2 filter), with that of the solvent as control value. In the reqiured non-solvent concentration range, the extinction curve suddenly rises very steeply, to almost 100%.

The required colour may be imparted to the mixtures by the addition to them of commercial, soluble dyes and pigments before coagulation. It is possible, however, to colour the sheet-form products after coagulation.

After the non-solvent has been added to it, the solution, which is now highly viscous and exhibits the aforementioned properties, is preferably filtered, for example through a copper gauze (mesh width 3,500–4,500 meshes per cm.$^2$). Filtration may be accelerated by excess or negative pressure, as known per se. Precautions should be taken to ensure that as little as possible of the solvent/non-solvent mixture is evaporated at this stage because this could result in premature solidification, for example. The air bubbles usually present in the solution may be removed from it by brief, repeated evacuation.

The solution thus prepared is then applied to a support or base and the solvent and non-solvent are left to evaporate, either at room temperature or at an elevated temperature below the boiling point of the solvent used.

The support or base may either be porous or non-porous. Examples of non-porous supports are glass or metal plates or silicone rubber matrices, and examples of porous supports are split leather (skiver), grain leather, woven or knitted textiles, felts, fleeces, paper or card.

When a non-porous support is used, the dry sheet is preferably transferred to porous substrates in accordance with the rules of known reversal processes, and bonded with non-continuous adhesive layers. The microporous sheets obtained by the direct or reversal process may be finished by the processes normally employed for artificial leather or natural leather.

In cases where the sheets are directly formed on porous substrates, most of the solvent mixture can be separated in liquid form.

In contemplating the production of leather-like products in sheet form on the basis of isoyanate reactions known per se, no expert would have been able to foresee that microporous sheet-form products which are permeable to water vapour, exhibit satisfactory properties and have the appearance of leather, could be produced by the simple process according to the invention.

The properties of polyurethanes which can be determined by the conventional standard tests, such as their tensile strength, breaking elongation, their structure and resilience, do not by themselves provide any indication as to whether the products obtained by the process according to the invention are capable of being converted into sheet-form products exhibiting a microporous structure and leather-like properties. This object is in fact only achieved by converting solutions of film-forming isocyanate-polyaddition products, which must exhibit the properties referred to above, into porous sheet-form products by the process according to the invention.

The tensile strength, breaking elongation and tear resistance are all dependent upon the permeability to water vapour. This property can be increased by using a larger quantity of non-solvent. Unfortunately, any increase in the permeability to water vapour is accompanied by a deterioration of the aforementioned mechanical properties. The optimum quantity of non-solvent for each system may be readily determined by tests.

PREPARATION OF THE ISOCYANATE-POLYADDITION PRODUCTS AS STARTING MATERIAL FOR THE PROCESS ACCORDING TO THE INVENTION ON A LABORATORY SCALE (CF. TABLE 1)

Method I (preadduct process)

The hydroxyl-group containing polyesters or polyethers (molecular weight 1,000–2,300) indicated in Table 1 are mixed, after dehydration, with the specified quantity of polyisocyanate at 80 to 130° C. in an apparatus equipped with stirrer, and the resulting mixture is stirred for 10 minutes (30 to 60 minutes in the case of a polyether containing secondary hydroxyl groups). The chain extender is then allowed to act at suitable temperatures, depending upon activity, provided that the ultimate temperature does not exceed 200° C. In most instances, the reaction is carried out at temperatures in the range from 120 to 170° C. If desired. the reaction mixture may be subsequently heated for 1 to 10 hours at 80 to 110° C., in order to complete the reaction.

The elastomeric reaction product is cooled to room temperature, granulated and then dissolved. A heterogeneous organic system with colloid and gel components is obtained and can be processed in the same way as a true solution.

Method II (one-shot process)

An anhydrous mixture, heated to 60–130° C., of the high molecular weight and low molecular weight compounds containing hydroxyl groups as specified in the Table is intimately mixed with the prescribed quantity of polyisocyanate. Contact is accompanied by a rise in the reaction temperature to 200° C., depending upon the reactivity of the polyisocyanate, optionally with the assistance of a catalyst. If necessary, the product poured into containers is after-heated at about 100° C. until the isocyanate content is less than 2% by weight, preferably less than 0.3% by weight. If desired, the isocyanate content may be reduced by means of catalysts during the subsequent dissolution step, accompanied by boiling under reflux.

The size-reduced material is converted, as is method I, either into a solution or into a microgel.

DESCRIPTION OF AN INDUSTRIAL PILOT PLANT FOR THE CONTINUOUS PRODUCTION OF THE STARTING MATERIAL BY METHOD I:

The anhydrous hydroxyl-group-containing polyester or polyether is stored in a heatable container and sprayed through a heatable Bosch pump into a pre-mixing injection chamber. Another Bosch pump delivers measured quantities of the polyisocyanate through an injection nozzle into the pre-mixing injection chamber where the aforementioned reaction components are intimately mixed.

The continuously throughflowing preadduct reacts in the absence of air in a residence tube (capacity 5 to 10 litres, maximum steam temperature 185° C.) which is connected downstream of the mixing chamber and which can be heated by steam and can also be cooled for the purposes of temperature control.

The chain extender is delivered by a gear pump into the mixing head of a "barbed" stirrer (delivery upwards) and united with the preadduct.

The polyurethane then leaves the mixing head of the barbed stirrer and passes either on to a conveyor belt or into aluminum containers equipped with closeable lids (capacity 25 to 30 kg.), and if desired is reheated at about 100° C. in a through-circulation cabinet.

DESCRIPTION OF AN INDUSTRIAL PILOT PLANT FOR METHOD II

In principle, the procedure is the same as described above, except that there is no pre-addition reaction in the residence tube, the pre-heated reaction components being instead directly combined in a mixing head.

PRODUCTION OF THE MICROPOROUS SHEET-FORM PRODUCT (CF. TABLE 2) BY THE PROCESS ACCORDING TO THE INVENTION (1) Direct process.—The solution of the isocyanate-polyaddition products (a) as identified in Table 1 and the other compounds (b) and/or (c) which, if desired, may be additionally used, are gradually mixed by means of a high-speed stirrer (at about 1,000 to 10,000 r.p.m.) with the quantities of non-solvent specified in Table 2. The mixture, which undergoes a marked increase in viscosity, is filtered if desired, freed where necessary from air bubbles by evacuation and poured onto a porous substrate (bonded or non-bonded fleece, textiles, split leather). Part of the solvent mixture may, if desired, be removed by suction through the adequately hardened microporous sheet and the substrate. The product is then left standing at room temperature or at somewhat elevated temperature at least until a non-marring microporous film is formed as the covering layer. In order to remove any residual solvents and to accelerate desired crosslinking reactions, the product may be briefly heated at 80° C. to a maximum of 20° C. below the softening or decomposition point.

(2) Reversal process.—A solvent/non-solvent mixture of the components specified in Table 2 is prepared as in the direct process and poured on to a waterproof smooth substrate, for example a glass plate or a polished metal plate, or on to a patterned substrate, for example on to a suitable metal plate or plastic support.

The coagulated, microporous film, which is formed after evaporation of the solvent, is bonded to a porous substrate, if desired after it has been heated. In order to retain the porosity of the film or its permeability to water vapour, the adhesive is applied to the substrate and the sheet, for example by rolling or spraying, in the form of a non-coherent layer, for example in screen, droplet or filament form.

Commercial adhesives may be used, for example a 10 to 15% by weight solution in ethyl/acetate or tetrahydrofuran of a toluylene-diisocyanate-modified adipic acid ethylene glycol polyester together with 2.5 to 5% by weight solution of a reaction product of 3 mols of toluylene diisocyanate with 1 mol of trimethylol propane in these solvents.

TABLE 1.—STARTING MATERIALS FOR DISSOLVED ISOCYANATE-POLYADDITION PRODUCTS (a)

| 1 | 2 | 3 | 4 | 5 | 6 | 7 | 8 | 9 |
|---|---|---|---|---|---|---|---|---|
| 1 | 72.90 I | 22.60 D44 | 4.50 B | 1.015 | I | 111/2 | 10 EE | ---- |
| 2 | 70.50 I | 24.00 D44 | 5.50 B | 0.970 | I | 195/2 | 10 THF | ---- |
| 3 | 70.35 I | 24.15 D44 | 5.50 B | 0.980 | I | 190/0 | 10 THF | 0.17 |
| 4 | 70.12 I | 24.40 D44 | 5.48 B | 0.992 | I | 185/0 | 10 THF | 0.21 |
| 5 | 69.86 I | 24.68 D44 | 5.46 B | 1.008 | II | 154/2 | 10 MAeK | ---- |
| 6 | 70.00 I | 24.55 D44 | 5.45 B | 1.000 | II | 112/2 | 10 THF | ---- |
| 6a | 70.00 I | 24.55 D44 | 5.45 B | 1.000 | II | 112/2 | 10 THF/W | ---- |
| 7 | 69.86 I | 24.68 D44 | 5.46 B | 1.008 | II | 130/2 | 10 THF | ---- |
| 8 | 70.61 I | 24.78 D44 | 4.61 B | 1.114 | II | 100/2 | 10 THF | 0.08 |
| 9 | 67.12 I | 26.92 D44 | 5.96 B | 1.054 | II | 110/2 | 10 THF | ---- |
| 10 | 57.15 I | 27.55 D44 9.18 ATD | 6.12 B | 1.000 | II | 139/2 | 15 THF | ---- |
| 11 | 61.33 I | 29.55 D44 | 9.12 D | 1.000 | II | 112/2 | 20 THF | ---- |
| 12 | 55.14 I | 35.38 D44 | 9.48 B | 1.050 | II | 117/2 | 20 THF | ---- |
| 13 | 49.68 I | 34.50 D44 | 4.99 B 10.83 T | 1.000 | II | 85/2 | 15 THF | ---- |
| 14 | 32.97 I | 39.68 D44 | 27.38 T | 1.000 | II | 142/2 | 15 THF | ---- |
| 15 | 69.75 II | 24.25 D44 | 6.00 B | 1.000 | I | 125/2 | 15 THF | ---- |
| 16 | 54.71 III | 35.55 D44 | 9.74 B | 1.050 | II | 120/2 | 10 THF | ---- |
| 17 | 68.78 IV | 25.80 D44 | 5.42 B | 1.092 | I | 100/2 | 10 M:THF=5:1 | 0.45 |
| 18 | 68.78 IV | 25.80 D44 | 5.42 B | 1.092 | I | 100/2 | 10 THF | 0.10 |
| 19 | 66.55 IV | 26.80 D44 | 6.65 B | 1.000 | I | 120/2 | 10 THF | ---- |
| 20 | 62.89 V | 31.45 D44 | 5.66 B | 1.000 | I | 120/2 | 21 THF | ---- |
| 21 | 60.25 VI | 28.90 T 65 | 10.85 B | 1.000 | I | 151/2 | 10 THF | 0.97 |
| 22 | 84.65 I+IV 2:1 | 12.72 DH | 2.63 B | 1.030 | I | 100/2 | 20 THF | ---- |

NOTE.—Explanation of Table 1:
Column 1: Example number.
Columns 2–7: Components and preparation conditions.
Columns 2–4: Data in parts by weight.
Column 2: I=Mixed polyester (mol. wt. 1,870 of 2,2-dimethyl-1,3-propane diol and 1,6-hexane diol in a ratio of 22:12 and adipic acid; II=ε-caprolactone polyester (molecular weight 2,300); III=Mixed polyester (mol. wt. 2,000) of ethylene glycol and 1,4-butane diol in a ratio of 1:1 and adipic acid; IV=Polyoxypropylene glycol (mol. wt. 2,000); V=Polyoxypropylene glycol (mol. wt. 1,000); VI=Polyester (mol. wt. 2,000) of ethylene glycol and adipic acid.
Column 3: D44=Diphenylmethane-4,4'-diisocyanate; ATD=Adduct of 2 mols of D44 and tetraethylene glycol; T 65=2,4- and 2,6-toluylene diisocyanate, isomer mixture 65=35; DH=1,6-hexamethylene diisocyanate.
Column 4: B=1,4-butane diol; D=Diethylene glycol; T=tetraethylene glycol.
Column 5: NCO/OH ratio.
Column 6: Method used to prepare the isocyanate-polyaddition products (a): I=Preadduct process; II=One-shot process.
Column 7: Maximum production temperature (° C.)/No. of hours after-heating at 100° C.
Column 8: Solvent and indication of concentration in percent by weight of the isocyanate polyaddition products (a): EE=Ethyl acetate; THF=Tetrahydrofuran; MAeK= Methyl ethyl ketone; M=Methylene chloride; THF/W=95% by weight tetrahydro furan solution.
Column 9: NCO-content in percent of the solution (column 8), based on the pure addition product.

TABLE 2.—PROCESS ACCORDING TO THE INVENTION FOR THE PRODUCTION OF SHEET-FORM PRODUCTS

| 1 | 2 | 3 | 4 | 5 | 6 | 7 | 8 | 9 | 10 |
|---|---|---|---|---|---|---|---|---|---|
| 1 | 1 | 23.5 L | DB | 30.0 WB | 1.2 | 100,000 | | | |
| 2 | 2 | | | 52.0 WB | 12.5 | 62,000 | | | |
| 3 | 2 | 23.5 L | DB | 63.0 WB | 3.5 | 200,000 | | | |
| 4 | 2 | | | 54.0 WB | 2.8 | 200,000 | | | |
| 5 | 2 | 23.5 L | DB | 60.0 WB | 4.4 | 200,000 | | | |
| 6 | 3 | | | 56.0 WB | 12.1 | 200,000 | | | |
| 7 | 3 | 23.5 L | DB | 59.0 WB | 2.7 | 200,000 | | | |
| 8 | 4 | 23.5 L | Z | 56.0 WB | 18.7 | 200,000 | | | |
| 9 | 4 | 23.5 L | Z | 53.4 WB | 8.5 | 200,000 | | | |
| 10 | 4 | | | 52.0 WB | 19.2 | 200,000 | | | |
| 11 | 5 | 18.5 L | SO | 49.0 WB | 10.1 | 200,000 | | | |
| 12 | 6a | | | 108.0 EA | 2.9 | 200,000 | | | |
| 13 | 6a | 5.0 PF | M | 102.0 EA | 24.7 | 200,000 | | | |
| 14 | 5 | 11.0 A | N | 48.0 WB | 22.8 | 200,000 | | | |
| 15 | 6 | 23.5 L | DB | 9.0 WB | 0.3 | | 240 | 575 | 36.7 |
| 16 | 6 | 23.5 L | DB | 31.0 WB | 0.2 | | 174 | 600 | 25.4 |
| 17 | 6 | 23.5 L | DB | 40.0 WB | 0.5 | | 240 | 575 | 36.7 |
| 18 | 6 | 23.5 L | DB | 43.4 WB | 2.9 | | 94 | 422 | 8.7 |
| 19 | 6 | 23.5 L | DB | 49.6 WB | 17.3 | | 29 | 107 | 3.6 |
| 20 | 6 | 23.5 L | DB | 55.4 WB | 22.1 | | 8 | 62 | 1.4 |
| 21 | 7 | 23.5 L | DB | 50.0 WB | 17.0 | 100,000 | 37 | 115 | 6.1 |
| 22 | 8 | 23.5 L | DB | 21.4 WB | 0.2 | | 233 | 425 | 21.4 |
| 23 | 8 | 23.5 L | DB | 37.8 WB | 0.9 | | 130 | 385 | 6.6 |
| 24 | 8 | 23.5 L | DB | 43.2 WB | 25.6 | | 103 | 350 | 5.1 |
| 25 | 8 | 23.5 L | DB | 48.6 WB | 31.0 | | 48 | 100 | 3.4 |
| 26 | 8 | 3.0 T | Z | 48.6 WB | 25.4 | 200,000 | 11 | 125 | 3.5 |
| 27 | 8 | 30.0 H | Z | 48.6 WB | 23.7 | 200,000 | 37 | 410 | 1.3 |
| 28 | 8 | 13.5 N | Z | 48.6 WB | 19.8 | 200,000 | 25 | 230 | 5.4 |
| 29 | 8 | 57.0 N | Z | 48.6 WB | 1.3 | | 170 | 160 | 2.5 |
| 30 | 9 | 23.5 L | DB | 41.0 WB | 6.8 | 200,000 | 90 | 190 | 6.8 |
| 31 | 10 | 23.5 L | DB | 64.0 WB | 15.6 | 100,000 | | | |
| 32 | 11 | 11.7 L | SO | 45.0 WB | 0.9 | 150,000 | 7 | 185 | 4.8 |
| 33 | 12 | 23.5 L | DB | 39.0 WB | 111.4 | 100,000 | | | |
| 34 | 1 5+13 | | | 100.0 WB | 1.5 | 90,000 | | | |
| 35 | 14 | | | 40.0 WB | 8.0 | 200,000 | 64 | 555 | 8.8 |
| 36 | 14 | 23.5 L | DB | 43.0 WB | 10.0 | 200,000 | 79 | 145 | 4.0 |
| 37 | 15 | 23.5 RF | DB | 104.0 WB | 9.7 | 100,000 | | | |
| 38 | 16 | 23.5 L | DB | 78.0 WB | 20.2 | 100,000 | | | |
| 39 | 17 | 23.5 L | DB | 160.0 WB | 14.6 | 200,000 | | | |
| 40 | 18 | 13.7 B | S | 160.0 WB | 1.0 | 145,000 | | | |
| 41 | 19 | 11.7 L | DB | 180.0 WB | 15.4 | 90,000 | | | |
| 42 | 2 20+5 | 0.7 DA | | 66.0 WB | 2.0 | 100,000 | | | |
| 43 | 21 | 23.5 L | DB | 48.0 WB | 3.2 | 90,000 | 116 | 335 | 19.2 |
| 44 | 22 | 27.5 B | E | 46.0 WB | 2.4 | 180,000 | 142 | 1,000 | 27.9 |
| 45 | 9 | 25.4 PF | M | 90 BA | 26.6 | >90,000 | 16 | 290 | 4 |
| 46 | 9 | 20.3 PF | M | 90 HP | 19.5 | >90,000 | 24 | 295 | 6.5 |

1 Ratio 1=4.
2 Ratio 1=2.

NOTE: Explanation of Table 2:
Column 1: No. of the test example.
Column 2: 100 parts by weight of the solution of isocyanate-polyaddition products (a) corresponding to Table 1. The solution used for Examples 27 and 28 additionally contains 20 and 25% by weight, respectively, of suspension polyvinyl chloride, K-value 60, based on pure polyurethane.
Column 3: Crosslinking agent, data in parts by weight solids content based on pure isocyanate-polyadduct, see column 2. L=75% by weight ethylacetate solution of the adduct of 1 mol of trimethylol propane and 3 mols of 2,4-toluylene diisocyanate; T=2,4-toluylene diisocyanate; H=1,6-hexamethylene diisocyanate; N=75% ethyl acetate/xylene solution (1:1) of the biuret triisocyanate of 3 mols of 1,6-hexamethylene diisocyanate and 1 mol of water; RF=Tris-[4-isocyanatophenyl]-thiophosphoric acid ester in the form of a 20% by weight solution in methylene chloride; PF=Paraformaldehyde; A=Dimethylol-hexahydropyrimidinone; B=Hexa-(methoxy)-methylmelamine; DA=Ethylene diamine.
Column 4: Catalysts: DB=Dimethylbenzylamine; Z=Dibutyl stannic dilaurate; SO=Stannous octoate; M=Maleic acid; S=Hydrochloric acid; E=Monochloroacetic acid.
Column 5: Parts by weight of non-solvent: WB=White spirit, fraction 100–140° C.; BA=Di-n-butyl ether; EA=Ethyl alcohol; HP=n-heptane.
Column 6: Permeability to water vapour, measured by IVP 15-method (mg./h. cm.²) cf "Das Leder" 12, (1961) p. 86–88.
Column 7: Folding strength, Baly-Flexometer, see "Das Leder," 8 (1957), pp. 190–191, number of folds without cracking.
Column 8: Tensile strength (kp./cm.²).
Column 9: Breaking elongation (percent).
Column 10: Tear propagation resistance, IUP (kp./cm.).

The direct process was used for Examples 8 and 27, the reversal process for the other examples.

For Examples 3, 5, 35 and 38, a 1 mm.-thick Perlon fleece of 1 den fibres (weight per square metre 500 to 700 g.) which had been bonded, ground and freed from "dust" in known manner, was used as the support or base. Split leather was used for Examples 4 and 9 and cotton plus for the remaining examples.

The properties listed in columns 8 to 10 relate to the microporous sheets-form products without substrates.

We claim:

1. A process for producing microporous sheets which are permeable to water vapor which comprises providing a solution of a polyurethane which has a Shore-A hardness of above 35, a tensile strength of above 70 kp./cm.² and a softening point of above 120° C. in an organic solvent, adding to this solution a liquid non-solvent which is a non-solvent for the polyurethane but is miscible with the organic solvent and which meets the following conditions:

the polyurethane absorbs less than 50% of its own weight of the non-solvent within 24 hours, and
the relative vaporization number of the non-solvent is higher than that of the organic solvent, said non-solvent being present in an amount of at least 60% of the quantity necessary to gell the original polyurethane solution, shaping the resulting solution on a substrate and evaporating solvent and non-solvent from the resulting solution after shaping.

2. The process of claim 1 wherein the polyurethane is prepared from a compound having active hydrogen groups selected from the group consisting of hydroxyl and amino groups and a molecular weight from 500 to 20,000 and a diisocyanate wherein the NCO/active hydrogen group ratio is between 0.6 to 1.5.

3. The process of claim 1 wherein the polyurethane contains less than 0.6 equivalents of reacted NCO per 100 parts of the final polymer.

4. The process of claim 1 wherein the polyurethane is an isocyanate polyaddition product reacted with at least one of (a) an additional cross-linking agent selected from the group consisting of a polyisocyanate, formaldehyde, a formaldehyde donor and a peroxide, or (b) additional compounds containing groups reactive with isocyanates.

5. The process of claim 1 wherein said solvent is selected from the group consisting of acetone, methyl ethyl ketone, tetrahydrofuran, ethyl acetate, methylene chloride and ethylene chloride.

6. The process of claim 1 wherein said non-solvent is selected from the group consisting of an aliphatic hydrocarbon, an alcohol and an ether.

7. The process of claim 1 wherein said substrate is a non-porous substrate.

8. The process of claim 1 wherein said substrate is a porous substrate.

9. The process of claim 1 wherein the sheet is produced on a non-porous substrate and is removed therefrom.

10. The process of claim 2 wherein part of the compound having hydroxyl or amino groups is replaced by a compound having active hydrogen atoms and having a molecular weight of up to 500.

References Cited

UNITED STATES PATENTS

| 2,901,467 | 8/1959 | Croco | 117—161X |
| 3,180,853 | 4/1965 | Peters | 117—161X |

WILLIAM D. MARTIN, Primary Examiner

T. G. DAVIS, Assistant Examiner

U.S. Cl. X.R.

117—135.5, 140, 142, 155; 264—49